United States Patent [19]
Ericsson et al.

[11] Patent Number: 5,884,178
[45] Date of Patent: Mar. 16, 1999

[54] METHOD AND APPARATUS FOR ESTIMATING SPEED OF A MOBILE STATION IN A CELLULAR COMMUNICATIONS SYSTEM

[75] Inventors: Linus Ericsson, Täby; Peter Björk, Rosersberg, both of Sweden

[73] Assignee: Telefonaktiebolaget L M Ericsson (publ), Stockholm, Sweden

[21] Appl. No.: 757,517

[22] Filed: Nov. 27, 1996

[51] Int. Cl.$^6$ .............................. G01S 13/08; H04Q 7/04
[52] U.S. Cl. ...................... 455/441; 455/456; 455/422; 455/436
[58] Field of Search ............................. 455/432, 436, 455/440, 441, 444, 449, 456, 524, 525; 73/178 R; 342/461; 375/344, 233, 232, 340

[56] References Cited

U.S. PATENT DOCUMENTS

| | | | |
|---|---|---|---|
| 4,893,317 | 1/1990 | Critchlow et al. | 375/97 |
| 5,136,616 | 8/1992 | Dent | 375/94 |
| 5,161,248 | 11/1992 | Bertiger et al. | 455/440 |
| 5,297,165 | 3/1994 | Ueda et al. | 375/12 |
| 5,394,158 | 2/1995 | Chia | 455/440 |
| 5,396,253 | 3/1995 | Chia | 455/441 |
| 5,432,822 | 7/1995 | Kaewell, Jr. | 375/340 |
| 5,513,221 | 4/1996 | Parr et al. | 375/344 |
| 5,657,487 | 8/1997 | Doner | 455/440 |
| 5,659,545 | 8/1997 | Sowles et al. | 370/324 |

FOREIGN PATENT DOCUMENTS

PCT/SE97/ 01993   6/1998   WIPO .

*Primary Examiner*—Nguyen Vo
*Assistant Examiner*—Edan Orgad
*Attorney, Agent, or Firm*—Jenkens & Gilchrist, P.C.

[57] ABSTRACT

A method and apparatus takes into account the Doppler shift of the information in a received burst, a frequency offset value is calculated for each received burst. For each burst, a signal quality value is calculated, which is compared with a predetermined signal quality threshold level. The absolute value of each of the frequency offset values whose signal quality value meets or exceeds the predetermined signal quality threshold is obtained. The frequency offset values whose signal quality values do not meet the threshold level are disregarded. The total mean of all of the absolute frequency offset values is then calculated. The total mean value is used to accurately estimate the speed of the mobile station. Consequently, the speed of faster and slower mobile stations can be readily distinguished, and a hierarchical cell structure can be effectively used to increase capacity and reduce handovers in a cellular communications system.

18 Claims, 4 Drawing Sheets

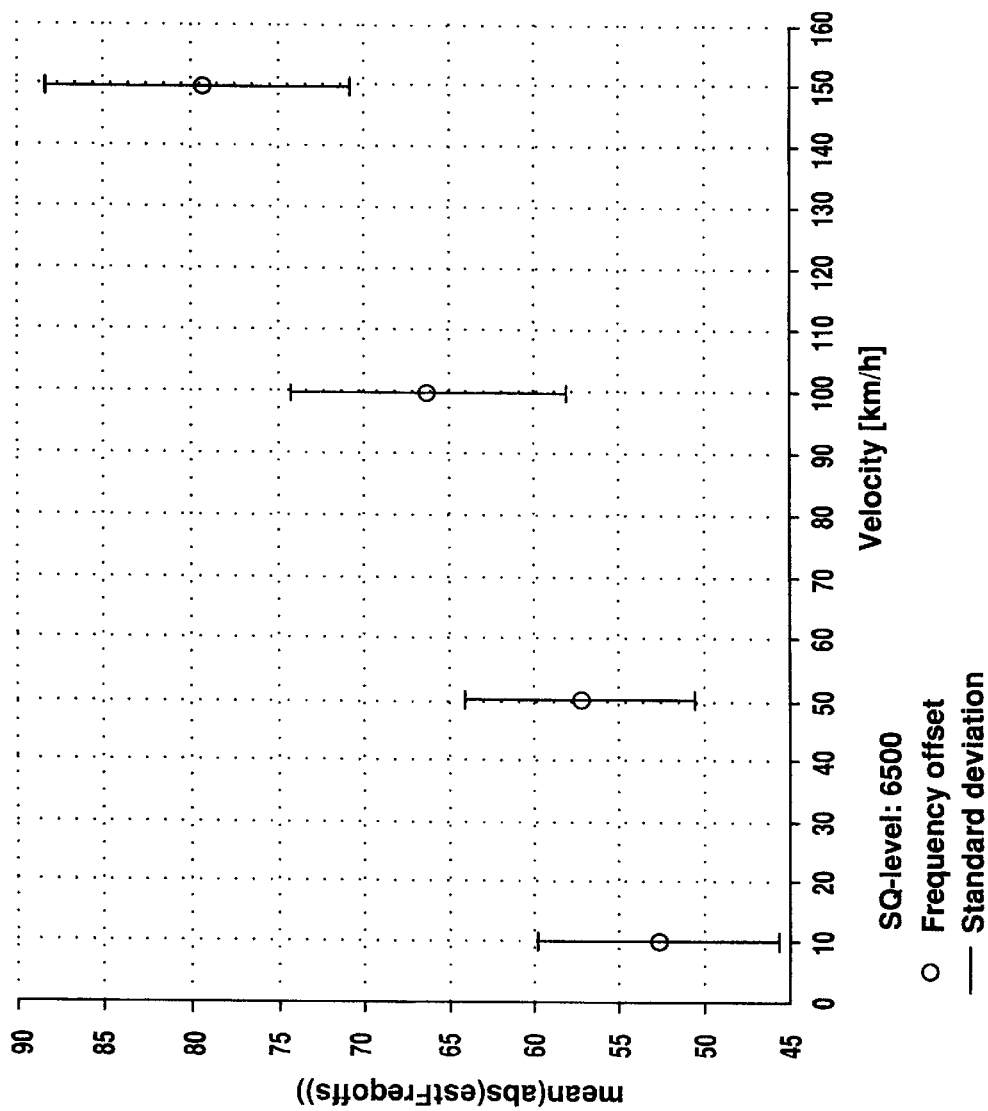

METHOD AND APPARATUS FOR ESTIMATING SPEED OF A MOBILE STATION IN A CELLULAR COMMUNICATIONS SYSTEM

BACKGROUND OF THE INVENTION

1. Technical Field of the Invention

The present invention relates in general to the mobile radio communications field and, in particular, to a method for estimating the speed of a mobile station in a cellular communications system.

2. Description of Related Art

In order to increase the capacity of cellular communications systems, relatively small cells referred to as "microcells" are being used. In order to handle much higher traffic requirements, the size of these cells has been decreased to a significant extent. Unfortunately, as the cell sizes are decreased, mobile stations operating in these systems cross the cell borders more frequently, which results in an increase in the number of handovers between cells. This handover problem is compounded by faster moving mobile stations, which cause an exceedingly high number of handovers as the cell sizes become very small.

An approach to solving this handover problem is to overlay the smaller cells with larger cells in a hierarchical manner. Consequently, the faster moving mobile stations can be assigned to a layer having larger cells, and the slower moving mobile stations can be assigned to a small cell layer.

In this regard, if the speed of the mobile stations could be accurately estimated, then the faster and slower moving mobile stations could be readily distinguished and placed in the appropriate cell layers. Notably, such a hierarchical cell structure would increase the overall system capacity significantly, all the while keeping the handover rate at a reasonable level.

Nevertheless, a problem with using such a layered cell approach with existing digital cellular communications systems is that there has been no method for accurately estimating the speed of a mobile station. For example, the European Global System for Mobile Communications (GSM) is a digital cellular communications system, which uses Time Division Multiple Access (TDMA) techniques to divide the carrier signals into time slots. The information transmitted or received during these time slots occurs in "bursts". For added diversity and secure communications, the GSM carrier bursts are frequency hopped. Consequently, there is no continuous signal available to be received in a GSM system. Therefore, the conventional methods that utilize a constant carrier envelope to estimate a mobile station's speed (e.g., "level crossing rate" method) cannot be used for systems like the GSM. Since the GSM and many other cellular systems use TDMA combined with frequency hopping, any technique used to estimate the speed of a mobile station in such a system would have to be able to utilize the information received during one burst, in order to provide an accurate estimation.

In typical urban environments (e.g., cities) where relatively high system capacities are needed, much smaller cells are being used. However, as mentioned earlier, the use of such smaller cells has produced a significant increase in handovers. Therefore, in order to alleviate the small cell/handover problem, a method is needed for accurately estimating the speed of a mobile station in a GSM or similar type of cellular system.

SUMMARY OF THE INVENTION

It is an object of the present invention to provide a method for accurately estimating the speed of a mobile station in a cellular communications system.

It is also an object of the present invention to provide a method of distinguishing between faster and slower mobile stations in a cellular communications system.

It is another object of the present invention to provide a method for accurately estimating the speed of mobile stations so that a hierarchical, layered cell structure can be effectively used in a cellular communications system.

It is yet another object of the present invention to increase the capacity of cellular communications systems through the efficient use of smaller cells.

It is yet another object of the present invention to decrease the handover rate in cellular communications systems.

In accordance with the present invention, the foregoing and other objects are achieved by a method for accurately estimating the speed of mobile stations in a cellular communications system. Taking into account the Doppler shift of the information in a received burst, a frequency offset value is calculated for each received burst. For each burst, a signal quality value is calculated, which is compared with a predetermined signal quality threshold level. The absolute value of each of the frequency offset values whose signal quality value meets or exceeds the predetermined signal quality threshold is obtained. The frequency offset values whose signal quality values do not meet the threshold level are disregarded. The total mean of all of the absolute frequency offset values is then calculated. The total mean value is used to estimate the speed of the mobile station. Consequently, the speed of faster and slower mobile stations can be readily distinguished, and a hierarchical cell structure can be effectively used to increase capacity and reduce handovers in a cellular communications system.

BRIEF DESCRIPTION OF THE DRAWINGS

A more complete understanding of the method and apparatus of the present invention may be had by reference to the following detailed description when taken in conjunction with the accompanying drawings wherein:

FIG. 7 is a graph that illustrates the relationship between the received frequency offsets and the speed of a mobile station, in accordance with the preferred embodiment of the present invention.

DETAILED DESCRIPTION OF THE INVENTION

The preferred embodiment of the present invention and its advantages are best understood by referring to FIGS. 1–7 of the drawings, like numerals being used for like and corresponding parts of the various drawings.

In order to better understand the present invention, a pertinent receiver process should first be described. Information transmitted from a mobile station (MS) to a base station (BS) (or vice versa) in a digital mobile radio communications system (e.g., in a GSM network), is normally received distorted. Generally, time dispersion of the transmitted signal in the radio channel causes inter-symbol interference (ISI) at the receiver. An equalizer is typically used in the receiver to compensate for such channel distortion. The Viterbi algorithm can be used to implement a maximum likelihood sequence estimator. The primary purpose of such an equalizer is to synchronize the received bursts, estimate the radio channel impulse response, and then use that information to demodulate the received bursts.

Essentially, an equalizer creates a mathematical model of the radio transmission channel (i.e., the air interface), and calculates the most probable transmitted data. A probable transmitted bit sequence is fed through the channel model, and the output is compared to the received bit sequence. After comparing these two bursts, the equalizer selects a "more probable" bit pattern, which is then fed through the channel model. This process is repeated until an acceptable bit pattern is found and demodulated.

Figure 1:
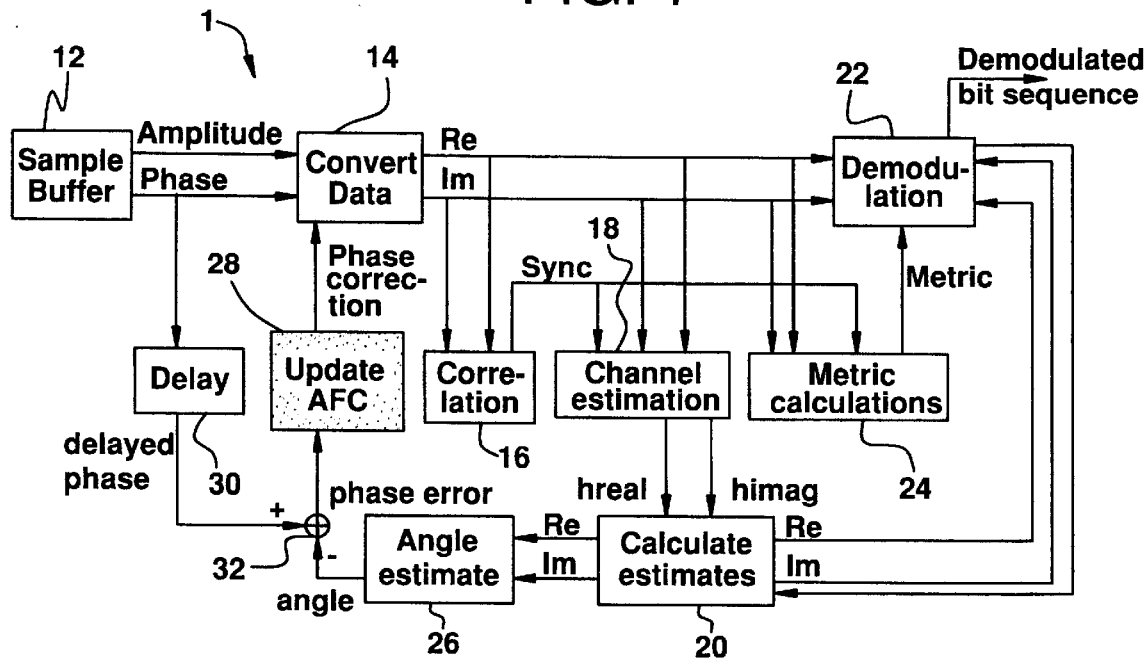
FIG. 1 is a schematic block diagram of an exemplary equalizer that may be used to implement the method of the present invention.

FIG. 1 is a schematic block diagram of an exemplary equalizer that may be used to implement the method of the present invention. As shown, equalizer 10 includes a sample buffer 12. When a burst arrives at a receiver (MS or BS), it is stored in sample buffer 12. The equalizer then synchronizes with the received burst, and the amplitude and phase of the received data are converted to the complex plane by a data converter 14. A Least Squares estimation is performed on the converted data by a channel estimation unit 18. The Least Squares estimation produces an estimated N-tap channel impulse response, h(m). This channel estimation response is used to compute a plurality of possible received values. This computation is performed by estimate calculation unit 20, which convolutes all possible sequences of N bits, u(n), with the channel estimate, h(m), to provide $2^N$ sample estimates, or est(i). These $2^N$ sample estimates, est(i), can be expressed as follows:

$$est(i) = \sum_{m=0}^{N-1} h(m)^* u(N-1-m) \quad (1)$$

The equalizer demodulates a burst at demodulator 22. When the burst is demodulated, the equalizer uses the known Viterbi algorithm (based on the known maximum likelihood criterion) to search a "trellis" for the path having the lowest total metric. The metric search is performed by metric calculator unit 24. At each state in the trellis, the sample estimate having the lowest metric is chosen.

Notably, when the MS is moving, Doppler shifts occur in the channel, and the phase of the received samples begins to drift. The Automatic Frequency Control (AFC) unit 28 calculates a phase correction angle, in order to compensate for this phase drift. A more detailed description of such a phase correction technique used in conjunction with a Viterbi analyzer is disclosed in U.S. Pat. No. 5,136,616 to Paul W. Dent.

Essentially, the phase of the incoming samples from sample buffer 12 is delayed a predetermined amount (e.g., by 3 samples) by a delay unit 30. At an adder 32, the delayed phase is algebraically added to an estimated angle from angle estimation unit 26. The angle estimate is calculated as disclosed in U.S. Pat. No. 5,136,616 to Paul W. Dent.

Figure 2:
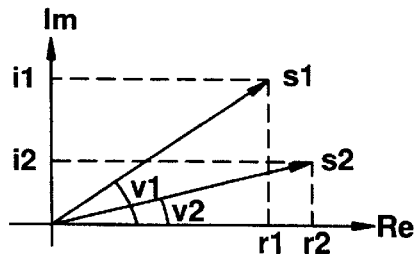
FIG. 2 is a graph that illustrates the phase error signal from the adder shown in FIG. 1.

FIG. 2 is a graph that illustrates the phase error signal from adder 32 in FIG. 1. Referring to FIG. 2, the vector, s1, represents the estimated received baseband signal vector that has the lowest metric. The vector, s2, represents the received signal vector delayed by three samples. The angle, v1, represents the angle estimate that corresponds to the sample estimate with the lowest metric. The angle, v2, represents the phase angle for vector s2. Consequently, the phase error signal from adder 32 can be expressed as follows:

$$P_e(n) = v_2(n-3) - v_1(n) + C_0 \quad (2)$$

where $P_e$ represents the phase error for a sample number n, $v_1(n)$ represents the angle estimate for the sample number n, $v_2(n-3)$ represents the angle for the received sample number n-3, and $C_0$ is a constant. The above-described equation (2) is initialized using the training sequence in the received burst. Consequently, the phase angle for the delayed sample is already in existence when the demodulation process begins.

Figure 3:
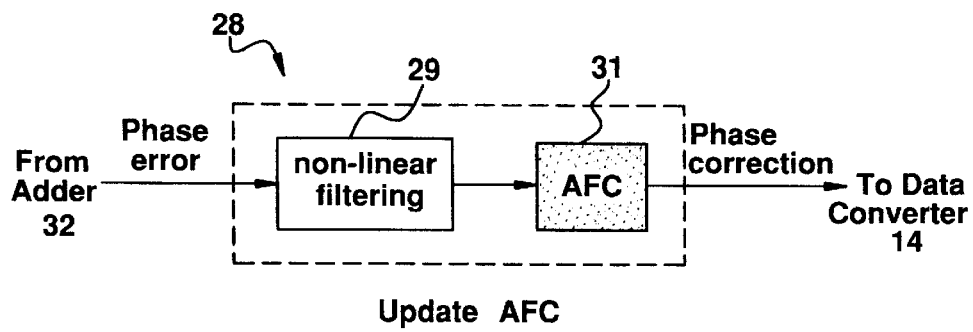
FIG. 3 is a schematic block diagram of the AFC update unit shown in FIG. 1.

FIG. 3 is a schematic block diagram of the AFC update unit 28 shown in FIG. 1. The phase error signal from adder 28 is filtered by a non-linear filter 29. The filtered phase error signal is then coupled to an AFC unit 31, which calculates a phase correction angle. The phase correction angle is then coupled to data converter unit 14, in order to compensate for the Doppler shift in the incoming burst.

The phase correction angle can be derived from the following equations:

$$F_e(n) = F_e(n-1) + C_1 P_e(n) \quad (3)$$

$$P_C(n) = P_C(n-1) + C_3 F_e(n) + C_2 P_e(n) \quad (4)$$

where n=1, . . . ,$N_b$. $F_e(n)$ represents the frequency error, $P_C(n)$ represents the phase correction, $P_e(n)$ represents the phase error, and $N_b$ represents the number of bits used to calculate the phase correction. The values $P_C(0)$ and $F_e(0)$ are initialization values, which are calculated with the assistance of the known training sequence in the burst, before the burst is demodulated.

Figure 4:
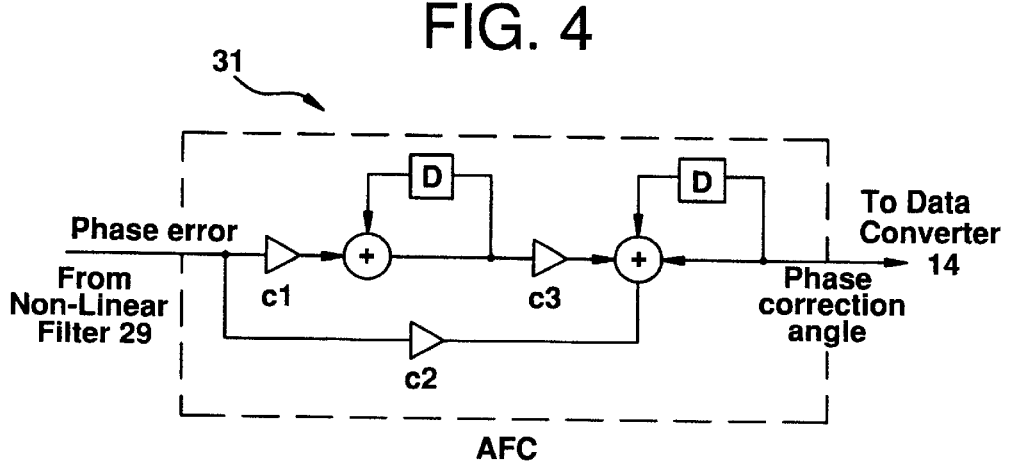
FIG. 4 is a schematic block diagram of the AFC unit shown in FIG. 3.

FIG. 4 is schematic block diagram of AFC unit 31 in FIG. 3, which illustrates the relationship between the frequency error and phase error derived from equations 3 and 4. As shown, equations 3 and 4 can be realized in block schematic form. Referring to FIG. 4, the phase correction angle is calculated from the filtered phase error and the coefficients C1, C2 and C3. This phase correction angle at the output of AFC unit 31, is used to correct the phase of the next sample from sample buffer 12 (FIG. 1). As such, the current phase correction angle is calculated from the previous phase correction angle, and is updated for each new sample from sample buffer 12. After a received burst is demodulated, a total phase correction angle is obtained. Consequently, one total phase correction angle is calculated for each received burst. Notably, since one total phase correction angle can be calculated for each received burst, the value of this total phase correction angle can be used to calculate a frequency offset for the burst, which can be expressed as:

$$F_O = (P_C C_4)/C_5 \quad (5)$$

where $F_O$ represents the frequency offset for a burst, $P_C$ represents the total phase correction angle for the burst, and $C_4$ and $C_5$ are constants. Again, one frequency offset value is calculated for each received burst. Exemplary values that can be used for the above-described constants are: $C_0=2\Pi$; $C_1=-2$; $C_2=-4$; $C_3=\frac{1}{8}$; $C_4=270833.0$; and $C_5=2\Pi*9472$.

In accordance with the preferred embodiment of the present invention, the frequency offsets from a plurality of bursts are used to calculate a mean value. This mean value of the frequency offsets is then used to estimate the speed or velocity of the MS relative to the BS. These calculations can be made under the control of a microprocessor in the MS, for example, or at a receiver on the network side (e.g., a processor at the BS). Specifically, assume that B frequency offset values are used to estimate a particular mobile's speed. In accordance with the preferred embodiment of the present invention, a method that can be used to calculate the total mean value from the B frequency offsets is illustrated in FIG. 5.

Figure 5:
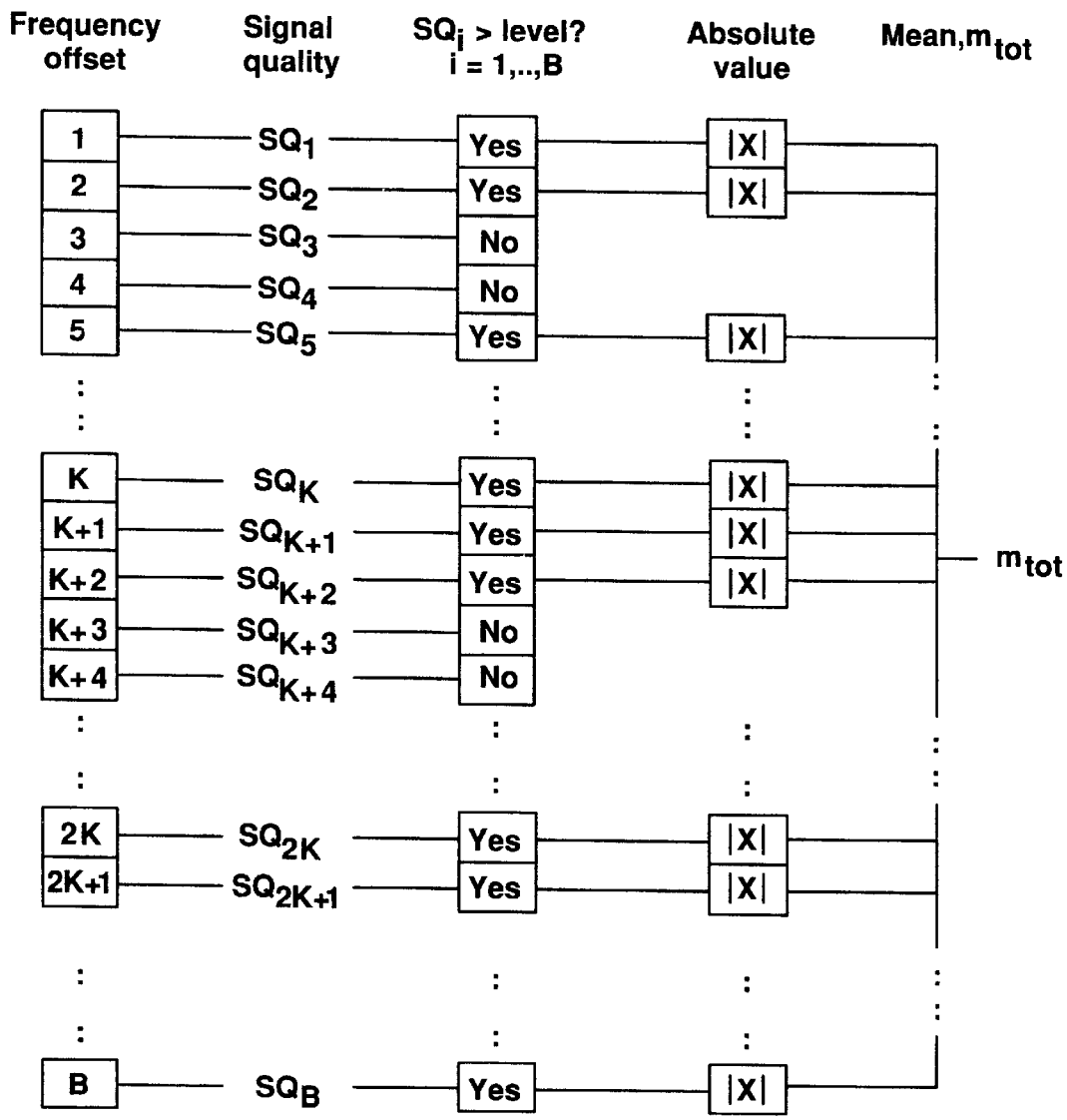
FIG. 5 is a diagram that illustrates a method that can be used to calculate the total mean frequency offset from a plurality of frequency offset values, in accordance with the preferred embodiment of the present invention.

Referring to FIG. 5, moving from left to right, the leftmost column represents the frequency offsets derived from B bursts (1, . . . ,B) received at an equalizer (e.g., equalizer 10). Moving to the right in FIG. 5, for each of the B frequency offsets derived, a quality measure (hereinafter referred to as the "signal quality" or SQ) is derived. A detailed description of a method for forming such a quality measure for received signal bursts is disclosed in commonly-assigned International Patent Application No. PCT/SE93/00648 to Linus L. Ericsson et al. The SQ for each of the B frequency offsets is then compared to a predetermined signal quality threshold level. For this embodiment, if the SQ for any of the B frequency offsets is equal to or greater than the predetermined threshold level, that frequency offset value is selected for further processing as being based on a "good" burst. Conversely, any frequency offset value whose corresponding SQ value is less than the predetermined SQ threshold value is considered to be associated with a "bad" burst and not selected for further processing. Generally, the SQ value for a received burst is directly related to the variations in the strength of the received signal, which are caused by fading, multipath propagation, etc. For example, if the signal being received at a MS is in a fading "dip", the SQ value seen at the receiver will be relatively small. Consequently, for this embodiment, only those frequency offset values derived from received bursts having SQ values that are greater than or equal to the predetermined threshold, are used to calculate the mean total of the frequency offset values.

Since the frequency offset values can be positive or negative values, the next step in the present method calculates the absolute value of each selected frequency offset value. The absolute value can be calculated by any known method. The final step is then to calculate the mean value of the selected absolute frequency offset values. Assuming that $N_p (\leq B)$ frequency offset values whose SQ values were equal to or greater than the predetermined SQ threshold value, the total mean of the selected frequency offset values can be expressed as follows:

$$m_{tot} = (1/N_p) \sum_{n=1}^{N_p} |F_O(n)| \tag{6}$$

where $N_p$ represents the number of selected frequency offsets (e.g., bursts with SQ values greater than or equal to the predetermined SQ threshold value), and $F_o(n)$ represents the selected frequency offset values being processed. The resulting total mean of the selected frequency offset values can then be used to accurately estimate the speed of the involved mobile station.

Figure 6:
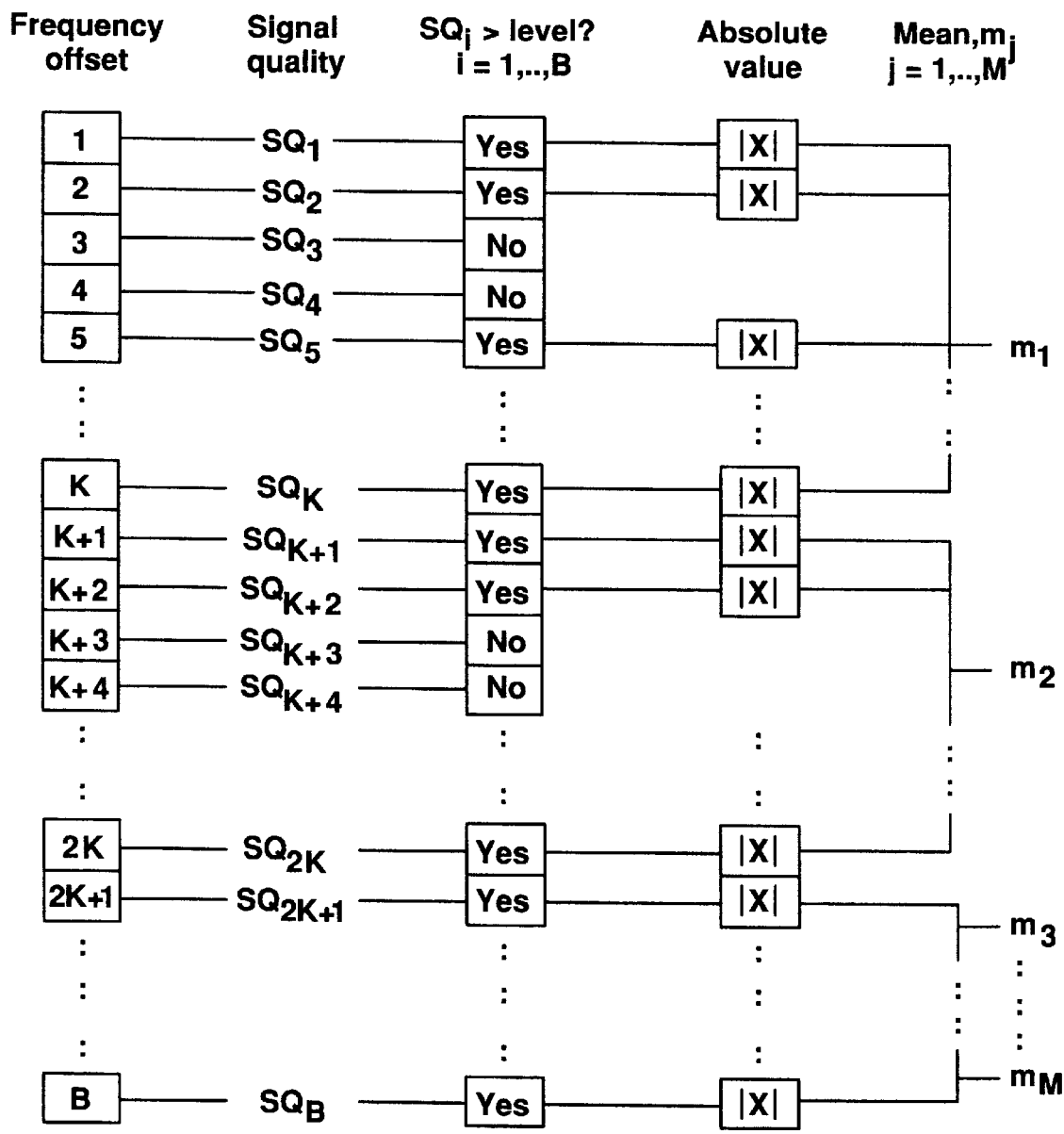
FIG. 6 is a diagram that illustrates a method for calculating the standard deviation of the mean offset values, in accordance with the preferred embodiment of the present invention.

In accordance with the preferred embodiment, once the total mean of the selected frequency offset values has been derived, in order to determine how the mean values of the selected frequency offset values will vary, the standard deviation of the mean values, $m_1, m_2, \ldots, m_M$ can be calculated. FIG. 6 is a diagram that illustrates a method for calculating the standard deviation of the mean offset values, in accordance with the preferred embodiment of the present invention. Moving from left to right in FIG. 6, in order to calculate the mean values, $m_1, \ldots m_M$, all of the incoming frequency offset values can be separated into blocks. Preferably, for this embodiment, each such block comprises K frequency offset values. If the total number of incoming frequency offset values is denoted as B, then the number of mean values, M, can be expressed as follows:

$$B = K*M \tag{7}$$

where K and M represent integers. Each block of K frequency offset values can be used to calculate one mean value, $m_i$, which can be expressed as follows:

$$m_i = (1/N_p) \sum_{n=1}^{N_p} |F_O(n)| \tag{8}$$

where i=1, . . . ,M. $N_p (\leq K)$ represents the number of selected frequency offset values whose SQ values were equal to or greater than the predetermined SQ threshold, and $F_O(n)$ represents those selected frequency offset values. Notably, each mean value, $m_i$, is derived from different blocks of frequency offset values.

The standard deviation of the mean values, $m_1, m_2, \ldots, m_M$, can thus be expressed as follows:

$$s^2 = 1/(M-1) \sum_{i=1}^{M} (m_i - m)^2 \tag{9}$$

where $$m = (1/M) \sum_{i=1}^{M} m_i \tag{10}$$

s represents the standard deviation of the mean values, mi represents the mean value, i (e.g., where i=1,2, . . . ,M), and M represents the number of mean values being processed.

FIG. 7 is a graph that illustrates the relationship between the received frequency offsets and the speed of a mobile station, in accordance with the preferred embodiment of the present invention. Specifically, FIG. 7 shows the correspondence between the mean total values, $m_{tot}$, of the received frequency offsets for different mobile station velocities, and also demonstrates how the mobile station's speed can be accurately estimated using the present mean frequency offset calculation method. The values shown in FIG. 7 were derived from a SysSim© simulation, for a typical urban environment where the communications capacity requirements are relatively high. The SQ threshold level chosen for this embodiment was 6500 ($0 \leq SQ \leq 8191$). The expression "SNR" represents the received signal-to-noise ratio, and "CTOI" represents the carrier-to-interference ratio. Also, frequency hopping was used for this embodiment. The constants used in Equations 7–10 (for this embodiment) were B=10400, K=104, and M=B/K=100.

As illustrated by FIG. 7, the estimated speed of a MS associated with a mean frequency offset of about 53 is 10 km/h. The estimated MS speed for a mean frequency offset of about 57.5 is 50 km/h. The estimated MS speed for a mean frequency offset of about 66 is 100 km/h, and for a mean frequency offset of about 79, the estimated speed of the MS is 150 km/h. The standard deviation shown for each frequency offset mean value is relatively small, which demonstrates the high accuracy of the estimates involved.

Although a preferred embodiment of the method of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for estimating speed of a mobile station in a cellular communications system, comprising the steps of:
    calculating a first value associated with a phase error for a plurality of received bursts;
    calculating a mean value based on at least one of said first values;
    converting said mean value to a speed value for said mobile station; and
    which further comprises the steps of:
        comparing a quality level of a burst associated with said first value with a predetermined quality level; and
        selecting for calculating said mean value those of said first values that correspond to a burst that has a quality level that meets or exceeds said predetermined quality level.

2. The method of claim 1, wherein said step of calculating a first value comprises the step of calculating a frequency offset value based on a phase correction angle.

3. The method of claim 2, wherein said step of calculating a mean value comprises the step of calculating a total mean frequency offset value.

4. The method of claim 1, further comprising the step of calculating an absolute first value for each of selected ones of said first values.

5. The method of claim 1, wherein said step of selecting for calculating said mean value those of said first values that correspond to a burst that has a quality level that meets or exceeds said predetermined quality level further comprises the step of selecting for calculating said mean value those of said first values that correspond to a burst that has a quality level that exceeds said predetermined quality level.

6. A method for estimating speed of a mobile radiotelephone, comprising the steps of:
    calculating a frequency offset from a phase correction angle, for a plurality of received blocks of information;
    comparing a quality level for said plurality of received blocks of information with a predetermined quality threshold level;
    calculating an absolute frequency offset for each said frequency offset associated with said plurality of received blocks of information that has a said quality level that meets or exceeds said predetermined quality threshold level; and
    calculating a total mean frequency offset from a plurality of said absolute frequency offsets, said total mean frequency offset corresponding to said speed of said mobile radiotelephone.

7. The method of claim 6, wherein each of said plurality of received blocks of information comprises a burst.

8. The method of claim 6, wherein said phase correction angle is generated in a receiver equalizer unit.

9. The method of claim 6, wherein said phase correction angle is associated with a phase error.

10. The method of claim 6, wherein said phase correction angle is generated in a receiver automatic frequency control unit.

11. The method of claim 6, wherein said step of calculating an absolute frequency offset for each said frequency offset associated with said plurality of received blocks of information that has a said quality level that meets or exceeds said predetermined quality threshold level further comprises the step of calculating an absolute frequency offset for each said frequency offset associated with said plurality of received blocks of information that has a said quality level that exceeds said predetermined quality threshold level.

12. An apparatus for use in estimating speed of a mobile station in a cellular communications system, comprising:
    means for generating a phase correction signal for a plurality of received blocks of information;
    means for comparing a quality level for said plurality of received blocks of information with a predetermined quality threshold level;
    means for calculating an offset value associated with said phase correction signals for each said phase correction signal associated with said plurality of received blocks of information that has a said quality level that meets or exceeds said predetermined quality threshold level;
    means for calculating a mean value based on at least one of said offset values; and
    means for converting said mean value to a speed value for said mobile station.

13. The apparatus of claim 12, wherein said means for generating a phase correction signal comprises an automatic frequency control apparatus.

14. The apparatus of claim 12, wherein each of said plurality of received blocks of information comprises a burst.

15. The apparatus of claim 12, wherein said cellular communications system comprises a TDMA system.

16. The apparatus of claim 12, wherein said means for calculating an offset value and mean value comprise a digital processor associated with said mobile station.

17. The apparatus of claim 12, wherein said means for calculating an offset value and mean value comprise a digital processor associated with a base station.

18. The apparatus of claim 12, wherein said means for calculating an offset value associated with said phase correction signals for each said phase correction signal associated with said plurality of received blocks of information that has a said quality level that meets or exceeds said predetermined quality threshold level comprises means for calculating an offset value associated with said phase correction signals for each said phase correction signal associated with said plurality of received blocks of information that has a said quality level the exceeds said predetermined quality threshold level.

* * * * *

UNITED STATES PATENT AND TRADEMARK OFFICE
CERTIFICATE OF CORRECTION

PATENT NO. : 5,884,178
DATED : March 16, 1999
INVENTOR(S) : Ericsson et al.

It is certified that error appears in the above-identified patent and that said Letters Patent is hereby corrected as shown below:

[21], Appl. No.        Replace "757,517"
                             With --08/757,517--

Column 8, line 56      Replace "the"
                             With --that--

Signed and Sealed this

Fifteenth Day of May, 2001

Attest:

NICHOLAS P. GODICI

Attesting Officer     Acting Director of the United States Patent and Trademark Office